United States Patent
Yan et al.

(10) Patent No.: US 10,678,759 B2
(45) Date of Patent: Jun. 9, 2020

(54) SYSTEMS AND METHODS OF PROVIDING DATA PROTECTION FOR HYPER-CONVERGED INFRASTRUCTURES

(71) Applicant: EMC IP Holding Company LLC, Hopkinton, MA (US)

(72) Inventors: Biao Yan, Jinjiang Zone (CN); Shawn Xiao, Chongqing (CN); Eileen Chen, Sichuan (CN); Ming Wang, Chengdu (CN); Loretta Liao, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 259 days.

(21) Appl. No.: 15/814,854

(22) Filed: Nov. 16, 2017

(65) Prior Publication Data

US 2019/0129979 A1 May 2, 2019

(30) Foreign Application Priority Data

Oct. 31, 2017 (CN) .......................... 2017 1 1050097

(51) Int. Cl.
| | | |
|---|---|---|
| *G06F 16/182* | (2019.01) | |
| *G06F 11/20* | (2006.01) | |
| *G06F 11/14* | (2006.01) | |
| *G06F 11/07* | (2006.01) | |
| *G06F 3/06* | (2006.01) | |

(52) U.S. Cl.
CPC ........ *G06F 16/184* (2019.01); *G06F 11/0709* (2013.01); *G06F 11/1464* (2013.01); *G06F 11/2094* (2013.01); *G06F 3/065* (2013.01)

(58) Field of Classification Search
CPC .............. G06F 16/184; G06F 11/0709; G06F 11/1464; G06F 11/2094; G06F 3/065
See application file for complete search history.

(56) References Cited

U.S. PATENT DOCUMENTS

| | | |
|---|---|---|
| 7,603,395 B1 | 10/2009 | Bingham et al. |
| 7,689,597 B1 | 3/2010 | Bingham et al. |
| 7,765,190 B1 | 7/2010 | Bingham et al. |
| 7,971,091 B1 | 6/2011 | Bingham et al. |
| 9,778,865 B1 | 10/2017 | Srinivasan et al. |
| 9,830,082 B1 | 11/2017 | Srinivasan et al. |

(Continued)

*Primary Examiner* — Jay A Morrison
*Assistant Examiner* — Antonio J Caiado
(74) *Attorney, Agent, or Firm* — BainwoodHuang

(57) ABSTRACT

Techniques for providing data protection in high availability cluster environments. The techniques employ multiple layers of data protection, including a first layer that provides full data protection for a source storage system at a first-layer destination storage system, and a second layer of data protection that provides distributed data protection for the source storage system among a cluster of second-layer destination storage systems. By employing multiple layers of data protection for a source storage system in a high availability cluster environment, the techniques can provide (i) full data protection at the first-layer destination storage system and (ii) distributed data protection at the cluster of second-layer destination storage systems, reducing the chance of data loss due to failure of the source storage system and/or the first-layer destination storage system, and eliminating a data bottleneck from the first-layer destination storage system to the cluster of second-layer destination storage systems.

16 Claims, 11 Drawing Sheets

(56) References Cited

U.S. PATENT DOCUMENTS

| | | | |
|---|---|---|---|
| 2006/0182050 A1* | 8/2006 | Dohm | G06F 11/2056 370/312 |
| 2012/0110279 A1* | 5/2012 | Fredricksen | G06F 16/119 711/154 |
| 2012/0173822 A1* | 7/2012 | Testardi | G06F 11/1453 711/135 |
| 2013/0006938 A1* | 1/2013 | Prahlad | G06F 16/2365 707/639 |
| 2013/0246865 A1* | 9/2013 | Resch | G06F 11/0727 714/54 |
| 2014/0281066 A1* | 9/2014 | Grube | G06F 3/067 710/74 |
| 2016/0147471 A1* | 5/2016 | O'Hare | G06F 3/0619 713/171 |
| 2016/0188898 A1* | 6/2016 | Karinta | G06F 16/172 726/4 |
| 2018/0373429 A1* | 12/2018 | Yamamoto | G06F 11/1076 |

* cited by examiner

SYSTEMS AND METHODS OF PROVIDING DATA PROTECTION FOR HYPER-CONVERGED INFRASTRUCTURES

BACKGROUND

Conventional systems for implementing data protection in a data storage system environment typically employ a data storage technique known as data replication, in which an organization's data at a source storage system are copied (or replicated) and stored at a destination storage system. For example, the destination storage system may be in the same physical location as the source storage system, or in a physical location that is remote from the source storage system. Such conventional systems can be configured to perform data replication automatically in response to a deficiency at the source storage system, such as reaching a low free-storage threshold, detecting a failure of an internal component, etc. In this way, a burden or opportunity for error placed on users of such conventional systems can be reduced.

SUMMARY

In recent years, high availability cluster data protection has been employed to provide continuing service when one or more data storage systems within a data storage system environment fail. A high availability cluster is a group of data storage systems, computers, devices, and/or network nodes that can detect a hardware fault and/or software error on a storage system running a specific application such as an input/output (I/O) (e.g., read/write (R/W)) application, and automatically restart the specific application on another storage system in a failover process, with little or no intervention from a system administrator. As a part of the failover process, specialized software running among the group of data storage systems can configure the respective storage systems before restarting the specific application, such as by restoring and/or importing data, mounting one or more file systems, etc. As a result, high availability cluster data protection can be achieved within the group of data storage systems with reduced downtime.

Implementing conventional data replication techniques within a high availability cluster environment can be problematic, however, in that such conventional techniques typically involve just a single layer of data protection. For example, an organization's data at a source storage system can be copied (or replicated) and stored at a destination storage system, resulting in full data protection at the single destination storage system layer. However, if the destination storage system subsequently experiences a hardware fault and/or software error, crashes, goes offline, or otherwise becomes inoperative, the data at the source storage system may no longer be fully data protected. Moreover, if both of the source storage system and the single destination storage system become inoperative, then any data stored on the source and destination storage systems, as well as the specific application running on the source storage system, may no longer be accessible.

Techniques are disclosed herein for providing data protection in high availability cluster environments. Such techniques are particularly suited for use in converged or hyper-converged infrastructures that operate using clusters or groups of data storage systems, computers, devices, and/or network nodes, such as in the "cloud." The disclosed techniques employ multiple (e.g., at least two) layers of data protection, including a first layer of data protection that provides full data protection for a source storage system at a destination storage system (also referred to herein as the "first-layer destination storage system"), and a second layer of data protection that provides distributed data protection among a cluster of destination storage systems (also referred to herein as the "second-layer destination storage systems").

In the event one or both of the source storage system and the first-layer destination storage system experience a hardware fault and/or software error, crash, go offline, or otherwise become inoperative, at least one of the destination storage systems in the multiple layers can be effectively promoted to take on the role of the source storage system and/or the first-layer destination storage system. Further, the source storage system, the first-layer destination storage system, and/or the second-layer destination storage systems can participate in a data collection process to assure that data is preserved at the source storage system, while being fully data protected at the first-layer destination storage system. By employing multiple layers of data protection for a source storage system in a high availability cluster environment, the disclosed techniques can provide (i) full data protection at a first-layer destination storage system and (ii) distributed data protection at a cluster of second-layer destination storage systems, thereby reducing the chance of data loss due to failure of one or both of the source storage system and the first-layer destination storage system, as well as eliminating a data bottleneck from the first-layer destination storage system to the cluster of second-layer destination storage systems.

In certain embodiments, a method of providing data protection in a high availability cluster network environment includes providing a source storage system, a first-layer destination storage system in a first layer of destination storage, and a cluster of second-layer destination storage systems in a second layer of destination storage. The source storage system stores data including a plurality of data slices, the first-layer destination storage system stores a replica of the data including the plurality of data slices, and the cluster of second-layer destination storage systems store replicas of the plurality of data slices respectively distributed among the second-layer destination storage systems. The method further includes, in response to the source storage system becoming inoperative, promoting the first-layer destination storage system to a role of source storage system, and promoting a chosen one of the second-layer destination storage systems in the cluster to a role of first-layer destination storage system.

In certain further embodiments, a method of providing data protection in a high availability cluster network environment includes providing a source storage system, a first-layer destination storage system in a first layer of destination storage, and a cluster of second-layer destination storage systems in a second layer of destination storage. The source storage system stores data including a plurality of data slices, the first-layer destination storage system stores a replica of the data including the plurality of data slices, and the cluster of second-layer destination storage systems store replicas of the plurality of data slices respectively distributed among the second-layer destination storage systems. The method further includes, in response to each of the source storage system and the first-layer destination storage system becoming inoperative, promoting any chosen one of the second-layer destination storage systems in the cluster to a role of source storage system, and promoting any other chosen one of the second-layer destination storage systems in the cluster to a role of first-layer destination storage system.

In certain additional embodiments, a system for providing data protection in a high availability cluster network environment includes a source storage system, a first-layer destination storage system in a first layer of destination storage, and a cluster of second-layer destination storage systems in a second layer of destination storage. The source storage system stores data including a plurality of data slices, the first-layer destination storage system stores a replica of the data including the plurality of data slices, and the cluster of second-layer destination storage systems store replicas of the plurality of data slices respectively distributed among the second-layer destination storage systems. The first-layer destination storage system and the cluster of second-layer destination storage systems are configured to operate in concert to detect the source storage system becoming inoperative, to promote the first-layer destination storage system to a role of source storage system, and to promote a chosen one of the second-layer destination storage systems in the cluster to a role of first-layer destination storage system.

Other features, functions, and aspects of the invention will be evident from the Detailed Description that follows.

BRIEF DESCRIPTION OF THE DRAWINGS

The foregoing and other objects, features, and advantages will be apparent from the following description of particular embodiments of the invention, as illustrated in the accompanying drawings in which like reference characters refer to the same parts throughout the different views.

FIG. 1b is a block diagram of an exemplary one of the source storage system, the first-layer destination storage system, and the second-layer destination storage systems included in the data storage system environment of FIG. 1a;

FIG. 2 is a diagram illustrating an exemplary technique for providing the source storage system of FIG. 1a with (i) full data protection at the first-layer destination storage system, and (ii) distributed data protection at the cluster of second-layer destination storage systems, within the data storage system environment of FIG. 1a;

FIG. 5a is an exemplary block data structure employed by the respective storage systems included in the data storage system environment of FIG. 1a;

FIG. 5b is an exemplary system status data structure employed by the respective storage systems included in the data storage system environment of FIG. 1a;

FIG. 7 is a flow diagram of an exemplary method of effectively promoting one of the second-layer destination storage systems to take on the role of the source storage system or the first-layer destination storage system, within the data storage system environment of FIG. 1a; and FIG. 8 is a flow diagram of an exemplary method of providing (i) full data protection at the first-layer destination storage system, and (ii) distributed data protection at the cluster of second-layer destination storage systems, within the data storage system environment of FIG. 1a.

DETAILED DESCRIPTION

Techniques are disclosed herein for providing data protection in high availability cluster environments. The disclosed techniques employ multiple (e.g., at least two) layers of data protection, including a first layer of data protection that provides full data protection for a source storage system at a destination storage system (also referred to herein as the "first-layer destination storage system"), and a second layer of data protection that provides distributed data protection among a cluster of destination storage systems (also referred to herein as the "second-layer destination storage systems"). By employing multiple layers of data protection in a high availability cluster environment, the disclosed techniques can provide (i) full data protection at a first-layer destination storage system and (ii) distributed data protection at a cluster of second-layer destination storage systems, thereby reducing the chance of data loss due to failure of one or both of the source storage system and the first-layer destination storage system, as well as eliminating a data bottleneck from the first-layer destination storage system to the cluster of second-layer destination storage systems.

Figure 1A:
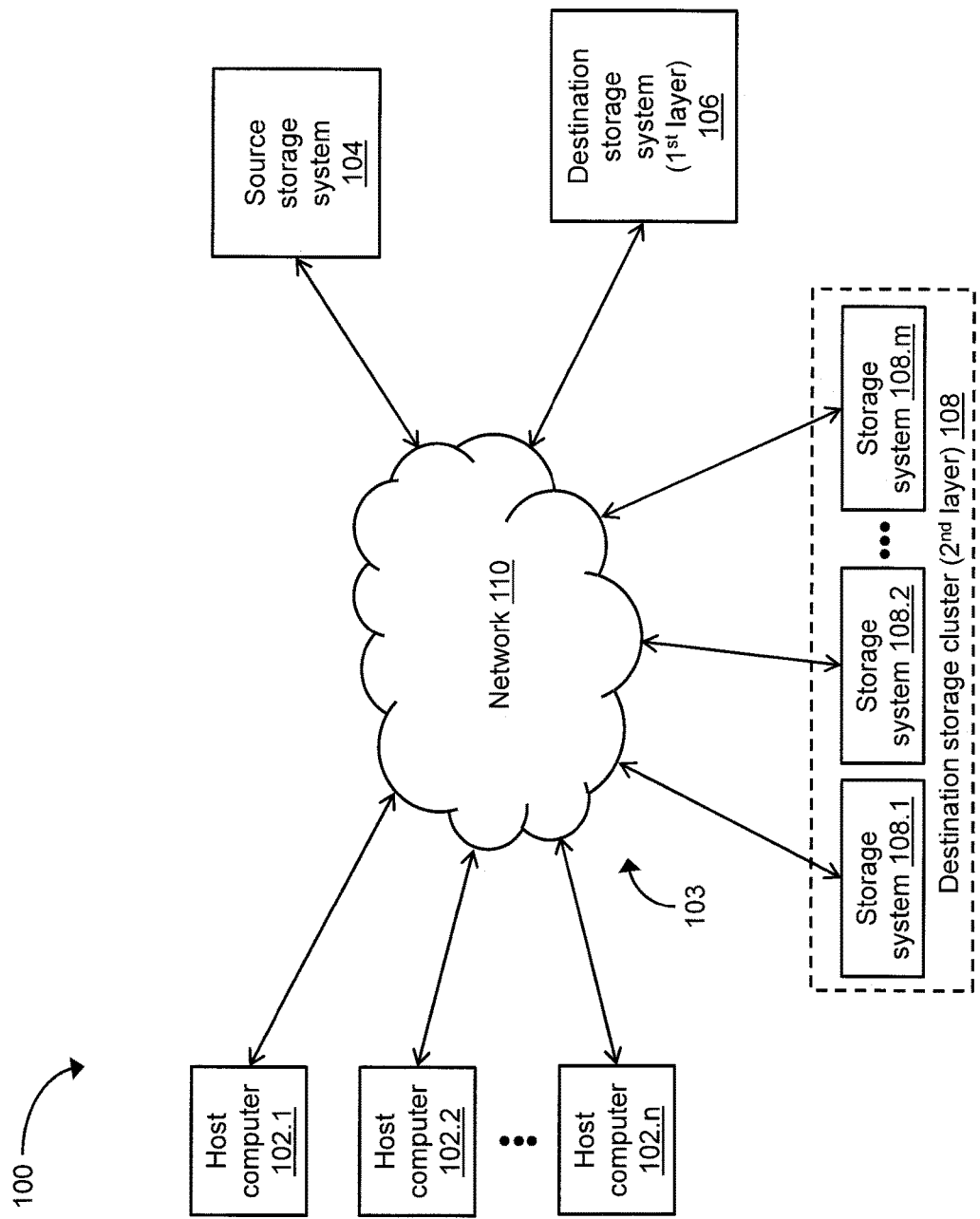
FIG. 1a is a block diagram of an exemplary data storage system environment, in which a source storage system can be provided with (i) full data protection at a first-layer destination storage system and (ii) distributed data protection at a cluster of second-layer destination storage systems.

FIG. 1a depicts an illustrative embodiment of an exemplary data storage system environment 100, in which an exemplary source storage system 104 can be provided with (i) full data protection at an exemplary destination storage system 106, and (ii) distributed data protection at a cluster 108 of exemplary destination storage systems 108.1, 108.2, . . . , 108.m. As shown in FIG. 1a, the data storage system environment 100 can include a plurality of host computers 102.1, 102.2, . . . , 102.n communicably coupleable to the source storage system 104 by a communications medium 103, which includes at least one network 110. For example, each of the plurality of host computers 102.1, 102.2, . . . , 102.n can be configured as a web server computer, a file server computer, an email server computer, an enterprise server computer, and/or any other suitable computer or computerized device for providing input/output (I/O) requests (e.g., small computer system interface (SCSI) commands) to the source storage system 104 over the network 110. Such I/O requests provided by the plurality of host computers 102.1, 102.2, . . . , 102.n can direct the source storage system 104 to store and/or retrieve blocks of data from logical storage units (LUNs) and/or virtual volumes (VVOLs) on behalf of the respective host computers 102.1, 102.2, . . . , 102.n.

The communications medium 103 including the network 110 can be configured to interconnect the plurality of host computers 102.1, 102.2, . . . , 102.n and the source storage system 104, as well as interconnect the source storage system 104, the destination storage system 106, and the cluster 108 of destination storage systems 108.1, 108.2, . . . , 108.m, to enable the respective host computers and/or storage systems to communicate and exchange signaling. As shown in FIG. 1a, at least a portion of the communications medium 103 is illustrated as a "cloud" to indicate that the communications medium 103 can have a variety of different topologies, including, but not limited to, a backbone topology, a hub-and-spoke topology, a loop topology, an irregular topology, or any suitable combination thereof. The communications medium 103 can also include, but is not limited to, copper-based data communications devices and cabling, fiber optic-based devices and cabling, wireless devices, or any suitable combination thereof. In addition, the communications medium 103 can be configured to support storage area network (SAN)-based communications, local area network (LAN)-based communications, cellular communications, wide area network (WAN)-based communications, distributed infrastructure communications, and so on, or any suitable combination thereof.

Figure 1C:
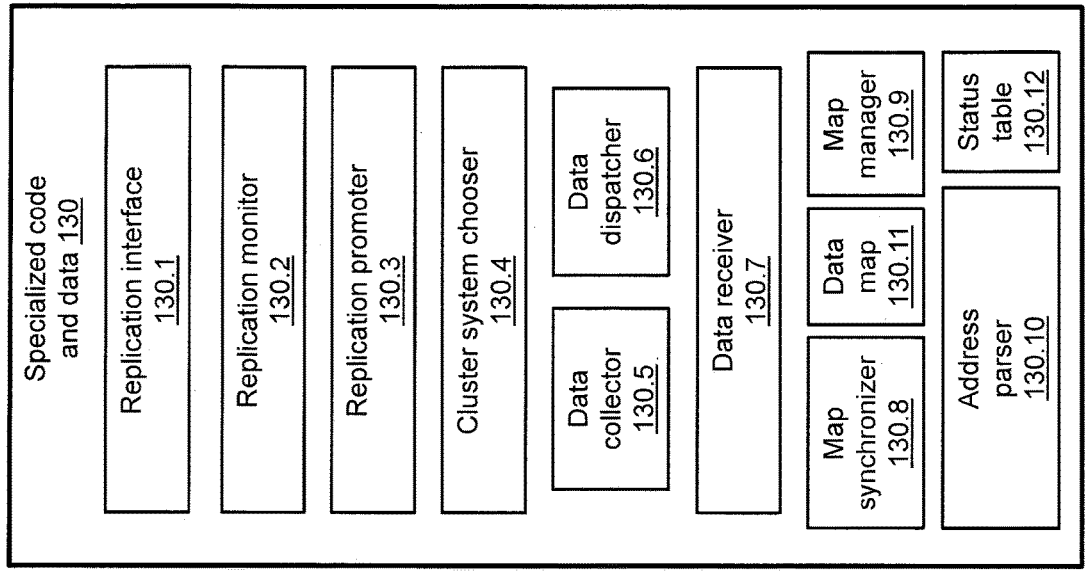
FIG. 1c is a functional block diagram of specialized code and data that can be implemented within a local memory of the exemplary storage system of FIG. 1b.
Figure 1B:
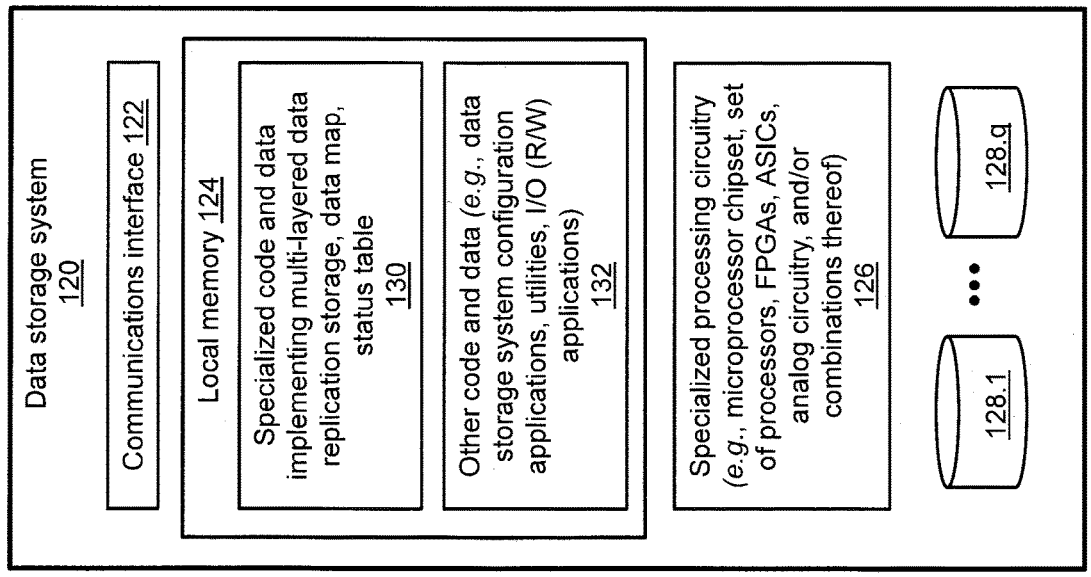

FIG. 1b depicts a detailed view of an exemplary data storage system 120. It is noted that each of the source storage system 104, the destination storage system 106, and the destination storage systems 108.1, 108.2, . . . , 108.m within the cluster 108 can be configured, at least in part, like the data storage system 120. As shown in FIG. 1b, the data storage system 120 can include a communications interface 122, a local memory 124, specialized processing circuitry 126, and one or more data storage devices 128.1, . . . , 128.q. The communications interface 122 can be configured to connect the data storage system 120 to the network 110 (se FIG. 1a), enabling access to one or more of the host computers 102.1, 102.2, . . . , 102.n, the source storage system 104, the destination storage system 106, and/or the destination storage systems 108.1, 108.2, . . . , 108.m, as appropriate. Such access over the network 110 can be storage area network (SAN)-based, Internet protocol (IP)-based, cellular-based, cable-based, fiber optic-based, cloud-based, wireless, and so on, or any suitable combination thereof.

The local memory 124 (see FIG. 1b) within the data storage system 120 can be configured to include volatile storage (e.g., dynamic random access memory (DRAM), static random access memory (SRAM)), as well as non-volatile storage (e.g., magnetic memory, flash memory). As shown in FIG. 1b, the local memory 124 can be configured to store a variety of software constructs, including specialized code and data 130 and other code and data 132. The specialized code and data 130 can include one or more sets of instructions that direct the specialized processing circuitry 126 to implement multi-layered data replication storage techniques involving the source storage system 104, the destination storage system 106, and/or the destination storage systems 108.1, 108.2, . . . , 108.m, as well as a data map (see FIG. 1c, reference numeral 130.11) and a status table (see FIG. 1c, reference numeral 130.12). The other code and data 132 can include one or more sets of instructions that direct the specialized processing circuitry 126 to perform input/output (I/O) (e.g., read and/or write (R/W)) operations involving the respective data storage devices 128.1, . . . , 128.q, as well as various other operations involving, for example, administrative tools, utilities, other user-level applications, and so on. The specialized processing circuitry 126 (see FIG. 1b) is configured to operate in accordance with the specialized code and data 130 and/or the other code and data 132 stored in the local memory 124. It is noted that the specialized processing circuitry 68 can be implemented in a variety of ways, using one or more processors (or cores) running specialized software, one or more application specific integrated circuits (ASICs), one or more field programmable gate arrays (FPGAs), one or more discrete components, digital circuits, analog circuits, and so on, or any suitable combination thereof.

In the context of the specialized processing circuitry 126 being implemented using one or more processors running specialized software, a computer program product can be configured to deliver all or a portion(s) of the specialized code and data 130 and other code and data 132 to the specialized processing circuitry 126. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by one or more of the processors, perform the processes and/or methods described herein. Such media may be considered to be articles of manufacture, and may be transportable from one data storage system to another data storage system.

The data storage devices 128.1, . . . , 128.q (see FIG. 1b) within the data storage system 120 can include one or more of volatile memory, non-volatile memory, floppy drives, hard disk drives (HDDs), solid state drives (SSDs), tape drives, optical drives, network attached storage (NAS) devices, storage area network (SAN) devices, and so on. Each data storage device 128.1, . . . , 128.q can be locally attached to an I/O channel of a respective data storage system while also being accessible over the network 110. Further, each data storage device 128.1, . . . , 128.q can be a single stand-alone component, or a system of data storage devices such as a collection of drives (e.g., a redundant array of inexpensive disks (RAID) group) logically operating together as a unified storage device to provide a desired level of data protection through redundancy. Such a RAID group can be configured to store large quantities of data for access by one or more processors operative to handle requests for allocation, as well as host I/O requests.

FIG. 1c depicts a plurality of functions 130.1-130.10 that can be performed by running the specialized code and data 130 out of the local memory 124 on the specialized processing circuitry 126 of the data storage system 120 (see FIG. 1b). One or more of the plurality of functions 130.1-130.10 can be performed by one or more of the source storage system 104, the destination storage system 106, and the destination storage systems 108.1, 108.2, . . . , 108.m to provide high availability data protection within the data storage system environment 100 (see FIG. 1a), in accordance with the processes and/or methods described herein. As shown in FIG. 1c, the plurality of functions 130.1-130.10 can include a replication interface function 130.1, a replication monitor function 130.2, a replication promoter function 130.3, a cluster system chooser function 130.4, a data collector function 130.5, a data dispatcher function 130.6, a data receiver function 130.7, a map synchronizer function 130.8, a map manager function 130.9, and an address parser function 130.10. The replication interface function 130.1 (see FIG. 1c) can be performed to receive requests from one or more of the respective storage systems 104, 106, and 108.1, 108.2, . . . , 108.m for sending/receiving data, promoting a respective storage system to take on a different role within the data storage system environment 100, and so on.

The replication monitor function 130.2 (see FIG. 1c) can be performed to detect, obtain, and/or store the statuses (e.g., the role, health status, and/or load status) of the respective storage systems 104, 106, and 108.1, 108.2, ..., 108.*m*. In certain embodiments, status information pertaining to the storage systems 104, 106, and 108.1, 108.2, ..., 108.*m* can be distributed among the respective storage systems, e.g., at periodic intervals, for storage in the status table 130.12. In the event any of the storage systems 104, 106, and 108.1, 108.2, ..., 108.*m* detects that the source storage system 104 or the destination storage system 106 has become inoperative (e.g., by monitoring a health signal generated by the source or destination storage system 104, 106), the storage system detecting the inoperative condition can trigger the replication promoter function 130.3 to effectively promote another data storage system within the data storage system environment 100 to take on the role of the source or destination storage system 104, 106. In certain further embodiments, the replication monitor function 130.2 can provide a suitable application programming interface (API) to the cluster system chooser function 130.4.

As described herein, the replication promoter function 130.3 (see FIG. 1*c*) can be performed to promote another data storage system within the data storage system environment 100 to take on the role of the source or destination storage system 104, 106 when the source or destination storage system 104, 106 is determined to be inoperative. In certain embodiments, when the source storage system 104 is determined to be inoperative, the replication promoter function 130.3 may (i) promote the destination storage system 106 to take on the role of the source storage system 104 to provide continuing service within the data storage system environment 100, and (ii) promote one of the destination storage systems 108.1, 108.2, ..., 108.*m* within the cluster 108 to take on the former role of the destination storage system 106 to maintain multiple layers of data protection within the data storage system environment 100.

The cluster system chooser function 130.4 (see FIG. 1*c*) can be performed (i) to negotiate or choose one or more destination storage systems in the cloud for inclusion in the cluster 108, (ii) to negotiate or choose a respective destination storage system within the cluster 108 for promotion to the role of the destination storage system 106 in the event the destination storage system 106 becomes inoperative, and (iii) to negotiate or choose another respective destination storage system within the cluster 108 for promotion to the role of the source storage system 104 in the event both of the source storage system 104 and the destination storage system 106 become inoperative. In certain embodiments, the choice of a respective destination storage system within the cluster 108 for promotion can be based at least in part on the respective destination storage system's current status (e.g., its current role, health status, load status) within the data storage system environment 100, as indicated in the status table 130.12.

The data collector function 130.5 (see FIG. 1*c*) can be performed to collect data from one or more of the source storage system 104, the destination storage system 106, and the destination storage systems 108.1, 108.2, ..., 108.*m* based at least in part on the current roles of the respective storage systems 104, 106, and 108.1, 108.2, ..., 108.*m* within the data storage system environment 100. Further, the data dispatcher function 130.6 (see also FIG. 1*c*) can be performed to distribute, copy, and/or replicate data among the source storage system 104, the destination storage system 106, and/or the destination storage system(s) 108.1, 108.2, ..., 108.*m* to assure that data is available at the source storage system 106, while being fully data protected at the destination storage system 106. It is noted that the data dispatcher function 130.6 can also be performed (i) to slice data, as appropriate, prior to distributing, copying, or replicating the data among the destination storage systems 108.1, 108.2, ..., 108.*m* within the cluster 108, and (ii) to update the data map 130.11, which can then be managed by the map manager function 130.9.

The data receiver function 130.7 (see FIG. 1*c*) can be performed to receive the data distributed by the data dispatcher function 130.6, and to store the received data in one or more of the data storage devices 128.1, ..., 128.*q* (see FIG. 1*b*). The map manager function 130.9 (see FIG. 1*c*) can be performed to manage the data map 130.11 maintained by the source storage system 104, the destination storage system 106, and the destination storage systems 108.1, 108.2, ..., 108.*m* within the cluster 108. The map synchronizer function 130.8 (see FIG. 1*c*) can be performed to assure consistency among all of the data maps 130.11 maintained by the respective storage systems 104, 106, and 108.1, 108.2, ..., 108.*m*. It is noted that, during a normal mode of operation, data can be collected and distributed among the respective storage systems 104, 106, 108.1, 108.2, ..., 108.*m* in accordance with the data maps 130.11 maintained by the respective storage systems 104, 106, 108.1, 108.2, ..., 108.*m*. The address parser function 130.10 (see FIG. 1*c*) can be performed to translate between logical addresses of R/W operations and physical addresses of the respective data storage devices 128.1, ..., 128.*q*.

The techniques disclosed herein for providing data protection in high availability cluster environments are particularly suited for use in hyper-converged infrastructures that operate using clusters or groups of data storage systems, computers, devices, and/or network nodes, such as in the cloud. Such hyper-converged infrastructures are generally configured to provide additional integration at the sub-assembly level. For example, a hyper-converged infrastructure can include multiple client computers, server computers, storage computers, network nodes, and/or any other suitable computers and/or computerized devices or nodes that have the capability of taking on and performing different roles, as required by the functionality of the environment. The techniques disclosed herein can employ multiple (e.g., at least two) layers of data protection within the data storage system environment 100, including a first layer of data protection that provides full data protection for the source storage system 104 at the destination storage system 106 (also referred to herein as the "first-layer destination storage system"), and a second layer of data protection that provides distributed data protection among the cluster 108 of destination storage systems 108.1, 108.2, ..., 108.*m* (also referred to herein as the "second-layer destination storage systems").

In the event one or both of the source storage system 104 and the first-layer destination storage system 106 experience a hardware fault and/or software error, crash, go offline, or otherwise become inoperative, at least one of the destination storage systems 106, 108.1, 108.2, ..., 108.*m* in the multiple layers can be effectively promoted to take on the role(s) of the source storage system 104 and/or the first-layer destination storage system 106. Further, the source storage system 104, the first-layer destination storage system 106, and/or the second-layer destination storage systems 108.1, 108.2, ..., 108.*m* can participate in a data collection process to assure that data is available at the source storage system 104, while being fully data protected at the first-layer destination storage system 106. By employing multiple layers of data protection for a source storage system in a high availability cluster environment, the disclosed techniques can provide (i) full data protection at a first-layer destination storage system and (ii) distributed data protection at a cluster of second-layer destination storage systems, thereby reducing the chance of data loss due to failure of one or both of the source storage system and the first-layer destination storage system, as well as eliminating a data bottleneck from the first-layer destination storage system to the cluster of second-layer destination storage systems.

The disclosed techniques for providing data protection in high availability cluster environments will be further understood with reference to the following illustrative examples, and FIGS. 2, 3a, 3b, 4a, and 4b. In each illustrative example, an exemplary data storage system environment is provided that includes the source storage system 104, the destination storage system 106 in a first layer of destination storage, and the cluster 108 of destination storage systems 108.1, 108.2, 108.3 in a second layer of destination storage. Further, the sets of instructions included in the specialized code and data 130 (see FIGS. 1b and 1c) can be executed in concert by the source storage system 104, the destination storage system 106, and/or the respective destination storage systems 108.1, 108.2, 108.3 within the cluster 108, as required to implement the functionality of the multi-layered data replication storage techniques described herein.

Figure 2:
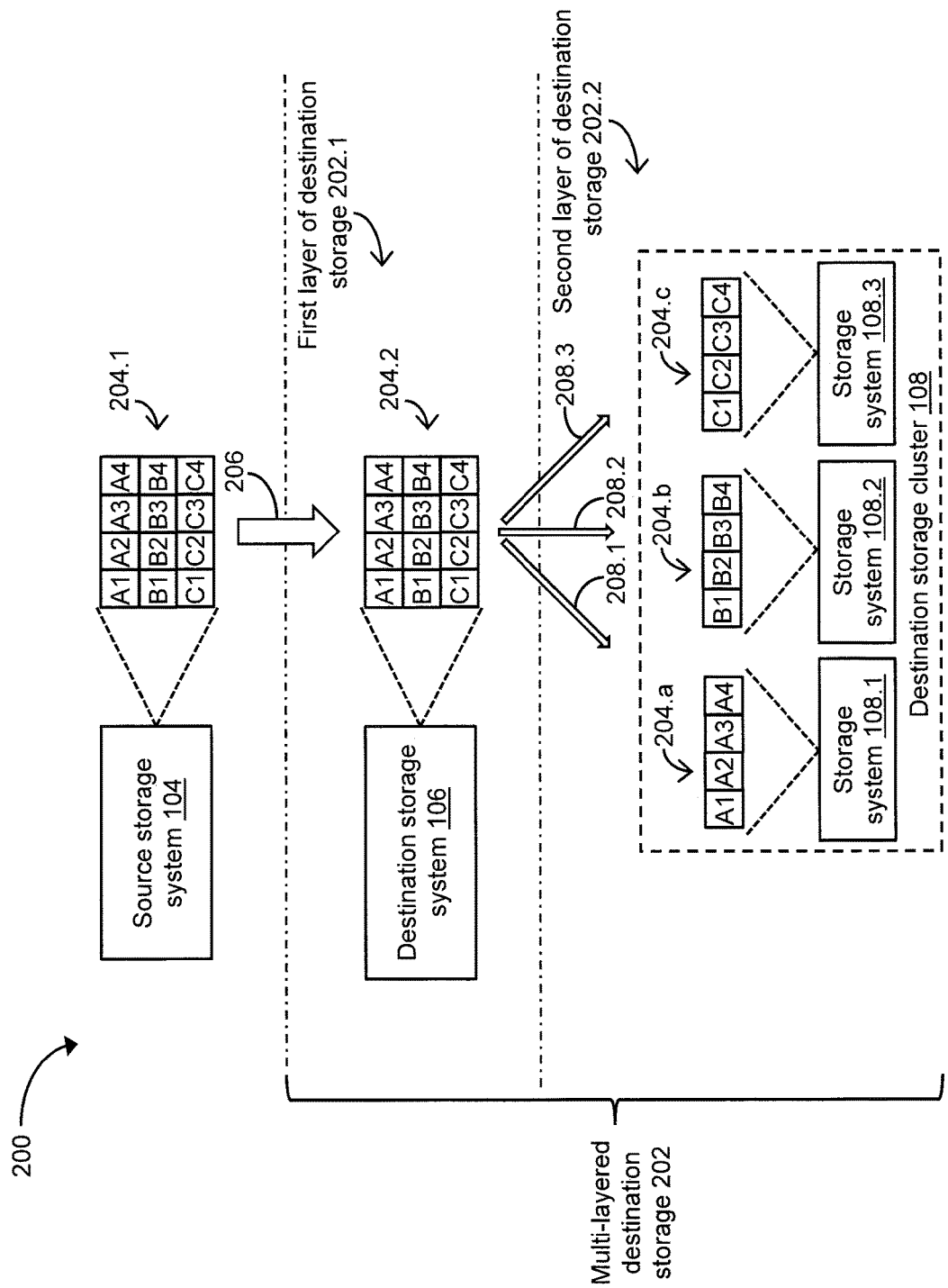

In a first example, with reference to FIG. 2, a data storage system environment 200 is provided that includes the source storage system 104, the destination storage system 106 in a first layer of destination storage 202.1, and the cluster 108 of destination storage systems 108.1, 108.2, 108.3 in a second layer of destination storage 202.2. The first layer of destination storage 202.1 and the second layer of destination storage 202.2 provide multi-layered destination storage 202 within the data storage system environment 200. In this first example, it is assumed that each of the source storage system 104, the destination storage system 106, and the destination storage systems 108.1, 108.2, 108.3 is operating online.

As shown in FIG. 2, in a normal mode of operation, data 204.1 including a plurality of data slices [A1, A2, A3, A4], [B1, B2, B3, B4], and [C1, C2, C3, C4] are stored on the source storage system 104. Further, a replication of the data 204.1 stored on the source storage system 104 is performed to the first-layer destination storage system 106, as illustrated by a directional arrow 206. Having performed the replication of the data 204.1 to the first-layer destination storage system 106, data 204.2 including copies of the plurality of data slices [A1, A2, A3, A4], [B1, B2, B3, B4], and [C1, C2, C3, C4] are stored on the first-layer destination storage system 106. It is understood that the data 204.2 stored on the first-layer destination storage system 106 is a copy or replication of the data 204.1 stored on the source storage system 104. A replication of the data 204.2 stored on the first-layer destination storage system 106 is then performed to the respective second-layer destination storage systems 108.1, 108.2, 108.3 within the cluster 108, as illustrated by directional arrows 208.1, 208.2, 208.3. Specifically, the data 204.2 is sliced to obtain copies of the separate data slices [A1, A2, A3, A4], [B1, B2, B3, B4], and [C1, C2, C3, C4]. Further, the data slice [A1, A2, A3, A4] is replicated and distributed to the second-layer destination storage system 108.1 (as illustrated by the directional arrow 208.1), the data slice [B1, B2, B3, B4] is replicated and distributed to the second-layer destination storage system 108.2 (as illustrated by the directional arrow 208.2), and the data slice [C1, C2, C3, C4] is replicated and distributed to the second-layer destination storage system 108.3 (as illustrated by the directional arrow 208.3).

Having performed the replication of the data 204.2 to the respective second-layer destination storage systems 108.1, 108.2, 108.3, a data unit 204.a including a copy of the data slice [A1, A2, A3, A4] is stored on the second-layer destination storage system 108.1, a data unit 204.b including a copy of the data slice [B1, B2, B3, B4] is stored on the second-layer destination storage system 108.2, and a data unit 204.c including a copy of the data slice [C1, C2, C3, C4] is stored on the second-layer destination storage system 108.3. It is understood that the data unit 204.a stored on the second-layer destination storage system 108.1 is a copy or replication of the data slice [A1, A2, A3, A4] included in the data 204.2, the data unit 204.b stored on the second-layer destination storage system 108.2 is a copy or replication of the data slice [B1, B2, B3, B4] included in the data 204.2, and the data unit 204.c stored on the second-layer destination storage system 108.3 is a copy or replication of the data slice [C1, C2, C3, C4] included in the data 204.2. As a result, full data protection is provided for the data 204.1 on the source storage system 104 at the first-layer destination storage system 106, and distributed data protection is provided at the plurality of second-layer destination storage systems 108.1, 108.2, 108.3.

Figure 3A:
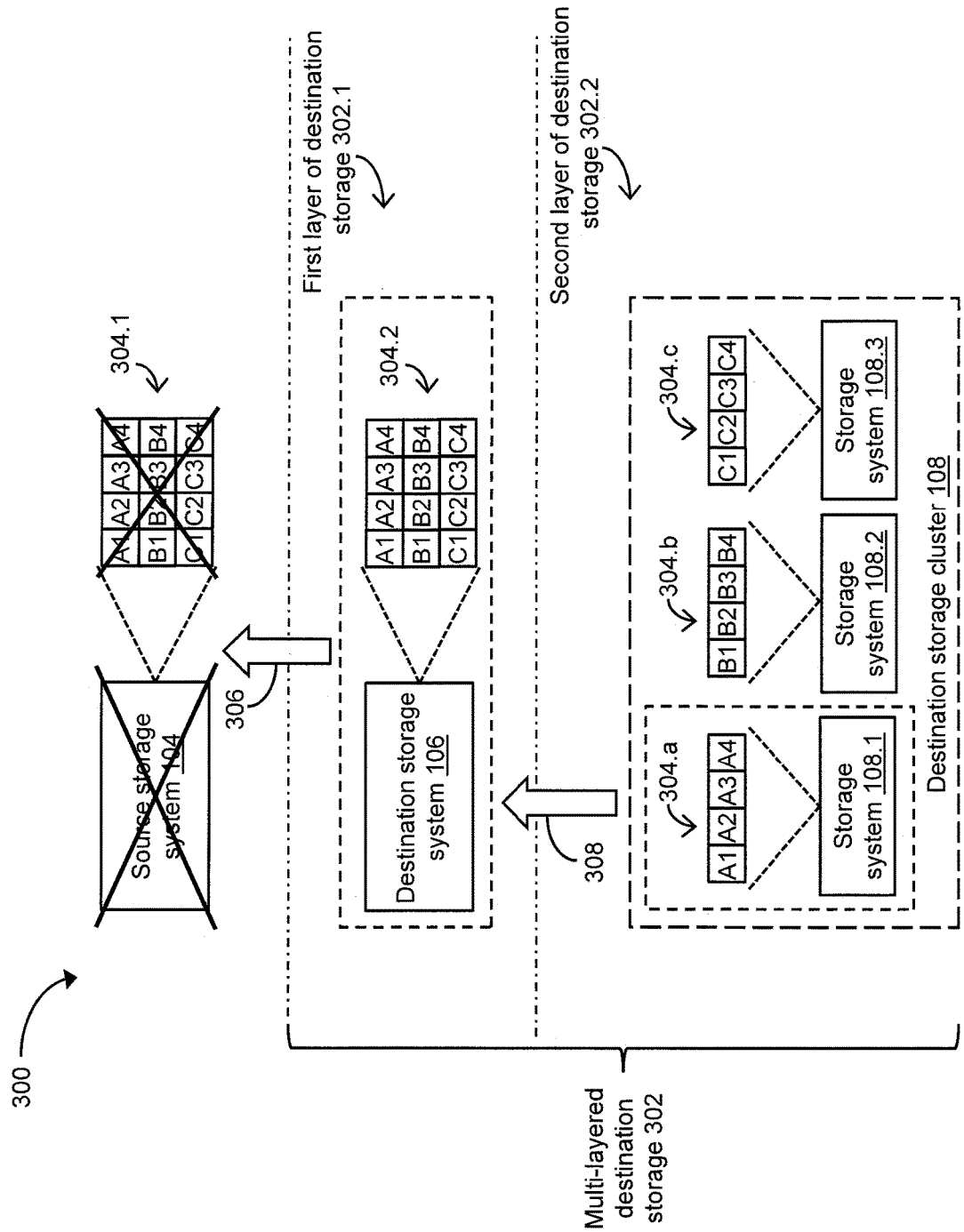
FIGS. 3a and 3b are diagrams illustrating an exemplary technique for maintaining full data protection within the data storage system environment of FIG. 1a, in the event the source storage system becomes inoperative.
Figure 3B:
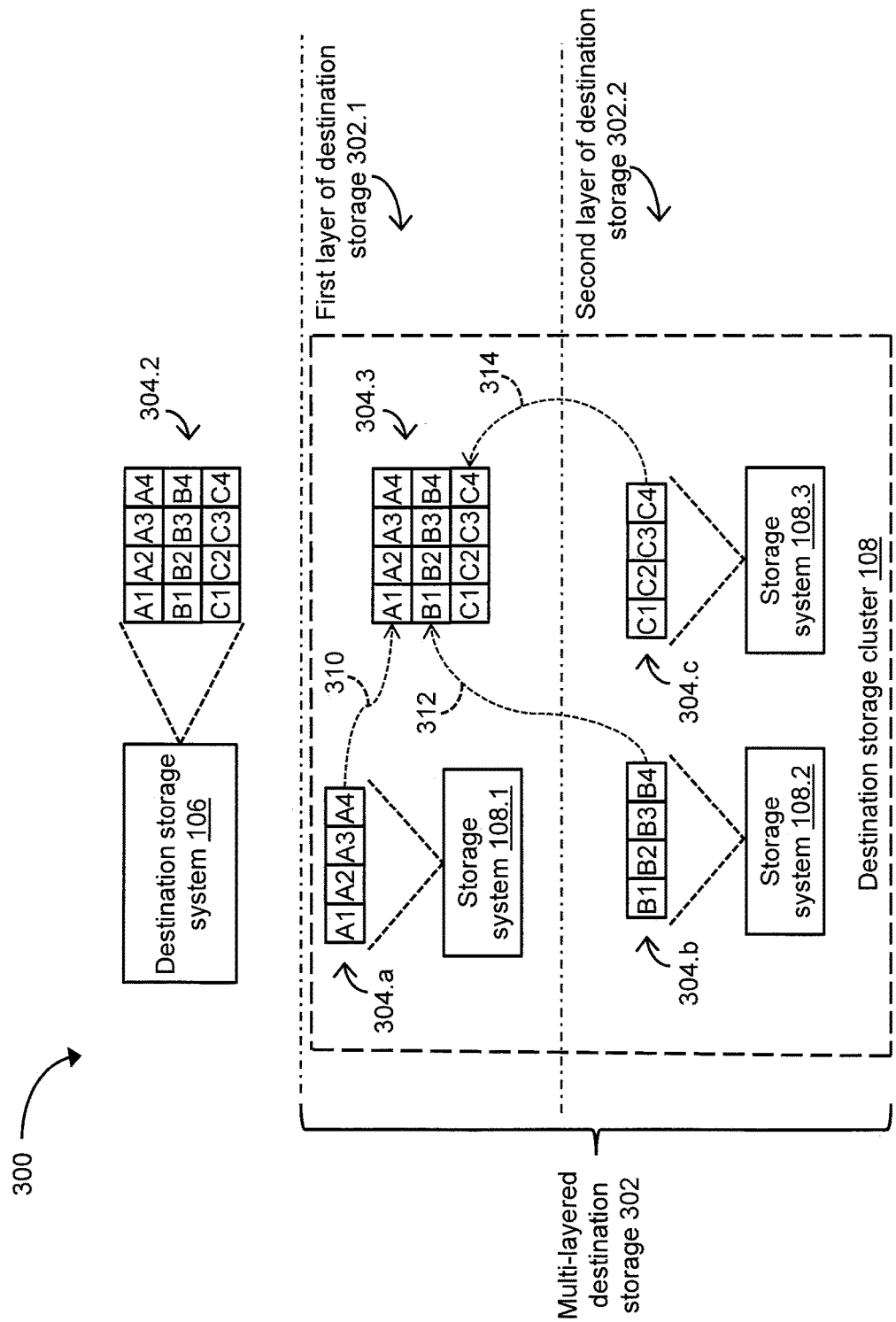

In a second example, with reference to FIGS. 3a and 3b, a data storage system environment 300 is provided that includes the source storage system 104, the destination storage system 106 in a first layer of destination storage 302.1, and the cluster 108 of destination storage systems 108.1, 108.2, 108.3 in a second layer of destination storage 302.2. The first layer of destination storage 302.1 and the second layer of destination storage 302.2 provide multi-layered destination storage 302 within the data storage system environment 300. In this second example, it is assumed that each of the source storage system 104, the destination storage system 106, and the destination storage systems 108.1, 108.2, 108.3 is initially operating online. While operating online, data 304.1 including a plurality of data slices [A1, A2, A3, A4], [B1, B2, B3, B4], and [C1, C2, C3, C4] are stored on the source storage system 104, and data 304.2 including copies or replications of the plurality of data slices [A1, A2, A3, A4], [B1, B2, B3, B4], and [C1, C2, C3, C4] are stored on the first-layer destination storage system 106. Further, a data unit 304.a including a copy or replication of the data slice [A1, A2, A3, A4] is stored on the second-layer destination storage system 108.1, a data unit 304.b including a copy or replication of the data slice [B1, B2, B3, B4] is stored on the second-layer destination storage system 108.2, and a data unit 304.c including a copy or replication of the data slice [C1, C2, C3, C4] is stored on the second-layer destination storage system 108.3.

At a subsequent time, the source storage system 104 becomes inoperative, as indicated by the cross (X) on the source storage system 104, as well as the cross (X) on the data 304.1 (see FIG. 3a) stored on the source storage system 104. Once the source storage system 104 becomes inoperative, the first-layer destination storage system 106 is promoted to take on the role of source storage system, as illustrated by a directional arrow 306. Further, the second-layer destination storage system 108.1 is chosen and promoted to take on the role of first-layer destination storage system, as illustrated by a directional arrow 308. FIG. 3b depicts the data storage system environment 300 upon completion of the promotion of the first-layer destination storage system 106 to the role of source storage system, and the promotion of the second-layer destination storage system 108.1 to the role of first-layer destination storage system. It is noted that the source storage system 104 is not shown in FIG. 3b due to its having become inoperative. It is further noted that, in this second example, once the second-layer destination storage system 108.1 has been promoted to the role of first-layer destination storage system, only the two second-layer destination storage systems 108.2, 108.3 remain in the second layer of destination storage 302.2. It is understood, however, that the cluster system chooser function 130.4 (see FIG. 1c) may be performed to choose one or more additional destination storage systems in the cloud for inclusion in the second layer of destination storage 302.2, as required by the functionality of the environment 300.

As shown in FIG. 3b, the data 304.2 (which is a copy or replication of the data 304.1 originally stored on the source storage system 104) is maintained in storage on the destination storage system 106 following its promotion to the role of source storage system. The destination storage system 106, in its role of source storage system, can therefore provide continuing service within the data storage system environment 300 with negligible downtime. However, only the data unit 304.a (which is a copy or replication of the data slice [A1, A2, A3, A4]) is maintained in storage on the destination storage system 108.1 following its promotion to the role of first-layer destination storage system. The data collector function 130.5 (see FIG. 1c) is therefore performed to collect the data unit 304.a, the data unit 304.b, and the data unit 304.c stored on the destination storage system 108.1, the destination storage system 108.2, and the destination storage system 108.3, respectively, to form data 304.3 and regain full data protection in the first layer of destination storage 302.1. To that end, the data unit 304.a including the data slice [A1, A2, A3, A4] is collected from the destination storage system 108.1 and incorporated into the data 304.3, as illustrated by a directional arrow 310. Further, the data unit 304.b including the data slice [B1, B2, B3, B4] is collected from the destination storage system 108.2 and incorporated into the data 304.3, as illustrated by a directional arrow 312; and, the data unit 304.c including the data slice [C1, C2, C3, C4] is collected from the destination storage system 108.3 and incorporated into the data 304.3, as illustrated by a directional arrow 314. As a result, the data 304.3 (which is a copy or replication of the data 304.2 stored on the destination storage system 106) are stored on the destination storage system 108.1 in the first layer of destination storage 302.1, thereby providing full data protection for the destination storage system 106 in its role of source storage system within the data storage system environment 300.

Figure 4A:
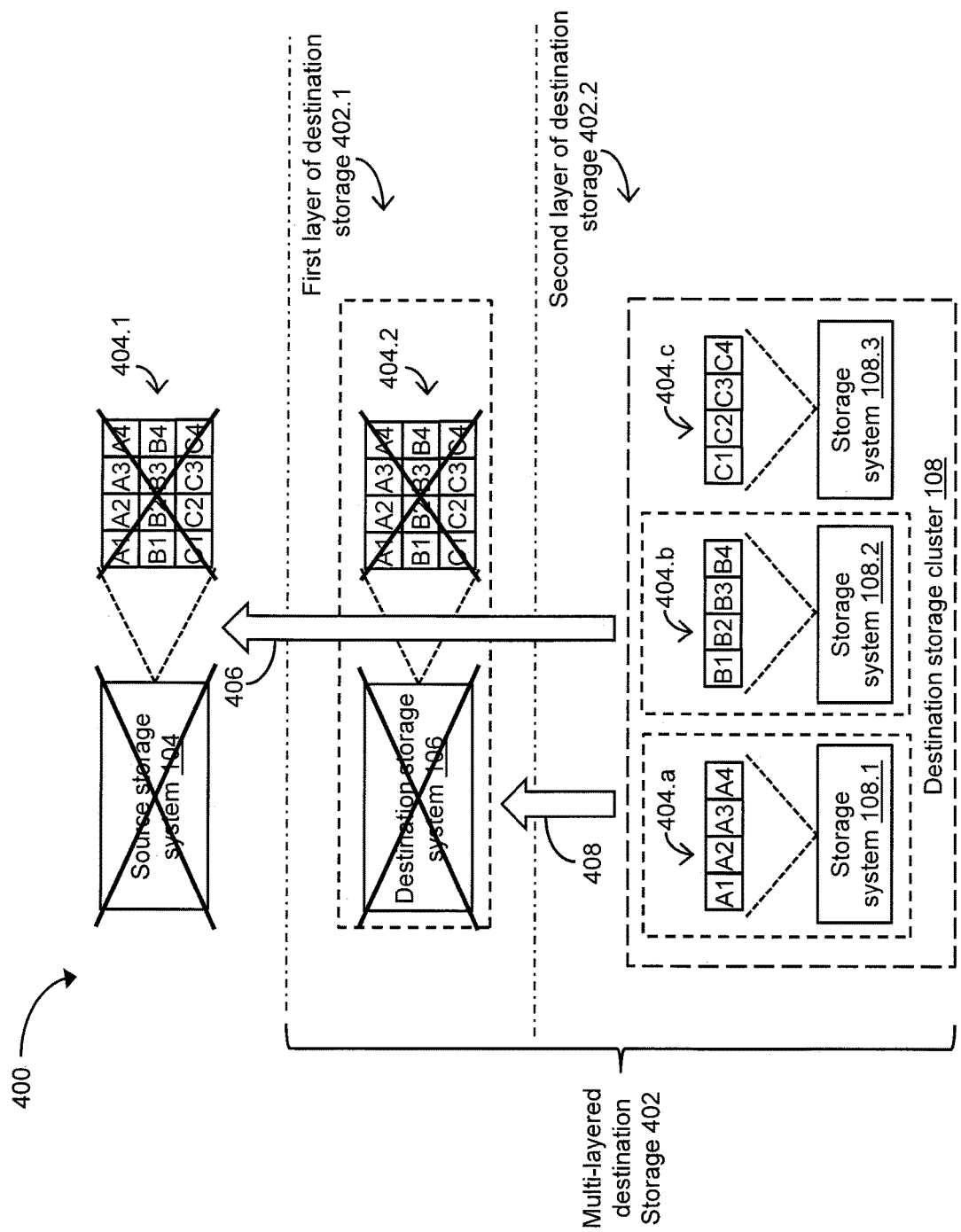
FIGS. 4a and 4b are diagrams illustrating an exemplary technique for maintaining full data protection within the data storage system environment of FIG. 1a, in the event both of the source storage system and the first-layer destination storage system become inoperative.
Figure 4B:
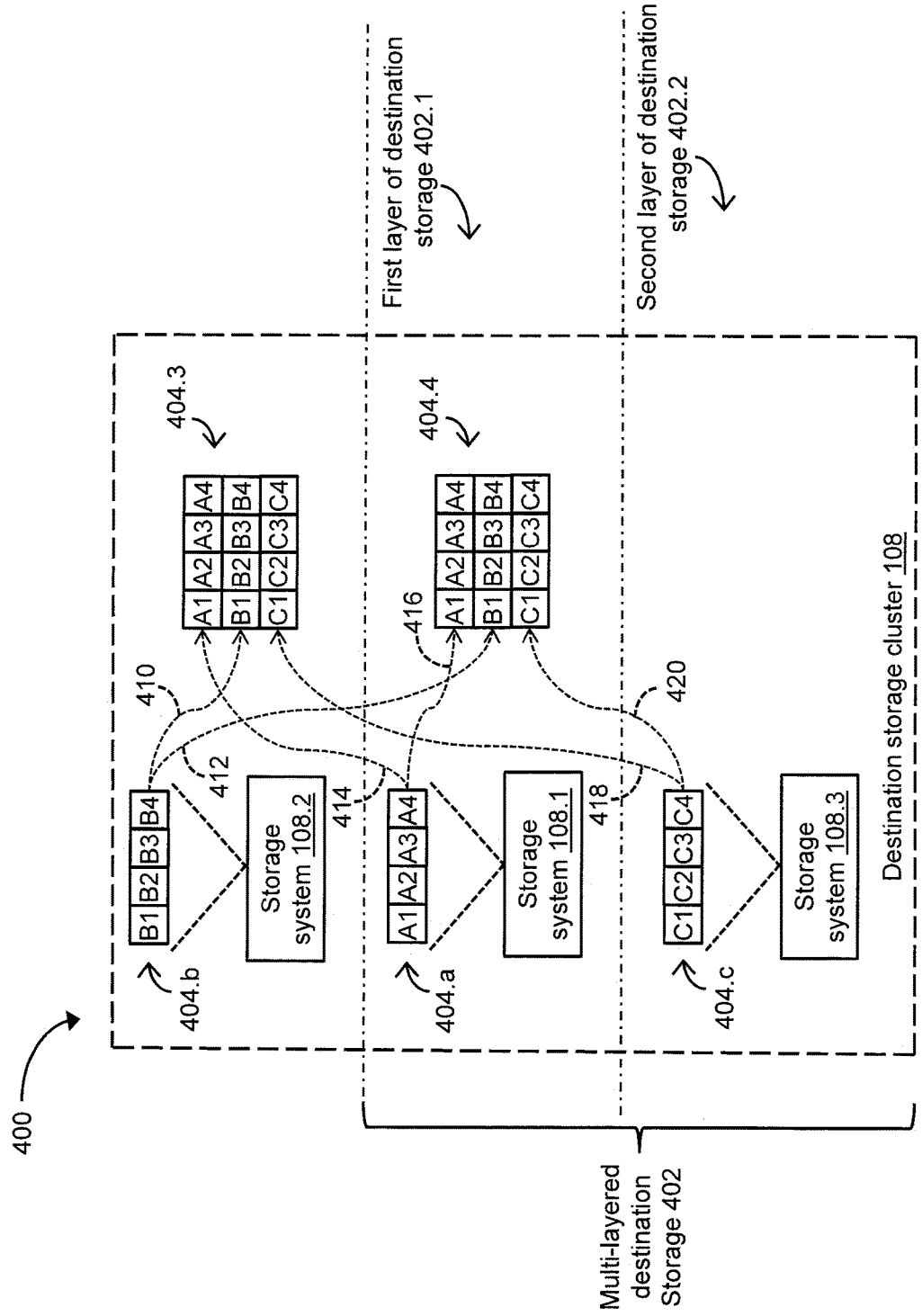

In a third example, with reference to FIGS. 4a and 4b, a data storage system environment 400 is provided that includes the source storage system 104, the destination storage system 106 in a first layer of destination storage 402.1, and the cluster 108 of destination storage systems 108.1, 108.2, 108.3 in a second layer of destination storage 402.2. The first layer of destination storage 402.1 and the second layer of destination storage 402.2 provide multi-layered destination storage 402 within the data storage system environment 400. In this third example, it is assumed that each of the source storage system 104, the destination storage system 106, and the destination storage systems 108.1, 108.2, 108.3 is initially operating online. While operating online, data 404.1 including a plurality of data slices [A1, A2, A3, A4], [B1, B2, B3, B4], and [C1, C2, C3, C4] are stored on the source storage system 104, and data 404.2 including copies or replications of the plurality of data slices [A1, A2, A3, A4], [B1, B2, B3, B4], and [C1, C2, C3, C4] are stored on the first-layer destination storage system 106. Further, a data unit 404.a including a copy or replication of the data slice [A1, A2, A3, A4] is stored on the second-layer destination storage system 108.1, a data unit 404.b including a copy or replication of the data slice [B1, B2, B3, B4] is stored on the second-layer destination storage system 108.2, and a data unit 404.c including a copy or replication of the data slice [C1, C2, C3, C4] is stored on the second-layer destination storage system 108.3.

At a subsequent time, the source storage system 104 becomes inoperative, as indicated by the cross (X) on the source storage system 104 and the cross (X) on the data 404.1 (see FIG. 4a) stored on the source storage system 104; and, the first-layer destination storage system 106 also becomes inoperative, as indicated by the cross (X) on the destination storage system 106 and the cross (X) on the data 404.2 (see also FIG. 4a) stored on the destination storage system 104. Once the source storage system 104 becomes inoperative, the second-layer destination storage system 108.2 is chosen and promoted to take on the role of source storage system, as illustrated by a directional arrow 406. Further, once the first-layer destination storage system 106 becomes inoperative, the second-layer destination storage system 108.1 is chosen and promoted to take on the role of first-layer destination storage system, as illustrated by a directional arrow 408. FIG. 4b depicts the data storage system environment 400 upon completion of the promotion of the second-layer destination storage system 108.2 to the role of source storage system, and the promotion of the second-layer destination storage system 108.1 to the role of first-layer destination storage system. It is noted that the source storage system 104 and the destination storage system 106 are not shown in FIG. 4b due to their having become inoperative. It is further noted that, in this third example, once the second-layer destination storage system 108.2 and the second-layer destination storage system 108.1 have been promoted to the role of source storage system and the role of first-layer destination storage system, respectively, only the single second-layer destination storage system 108.3 remains in the second layer of destination storage 402.2. It is understood, however, that the cluster system chooser function 130.4 (see FIG. 1c) may be performed to choose one or more additional destination storage systems in the cloud for inclusion in the second layer of destination storage 402.2, as required by the functionality of the environment 400.

As shown in FIG. 4b, only the data unit 404.b (which is a copy or replication of the data slice [B1, B2, B3, B4]) is maintained in storage on the destination storage system 108.2 following its promotion to the role of source storage system. The data collector function 130.5 (see FIG. 1c) is therefore performed to collect the data unit 404.a, the data unit 404.b, and the data unit 404.c stored on the destination storage system 108.1, the destination storage system 108.2, and the destination storage system 108.3, respectively, to form data 404.3 and assure data availability at the destination storage system 108.2 in its role of source storage system. To that end, the data unit 404.a including the data slice [A1, A2, A3, A4] is collected from the destination storage system 108.1 and incorporated into the data 404.3, as illustrated by a directional arrow 414. Further, the data unit 404.b including the data slice [B1, B2, B3, B4] is collected from the destination storage system 108.2 and incorporated into the data 404.3, as illustrated by a directional arrow 410; and, the data unit 404.c including the data slice [C1, C2, C3, C4] is collected from the destination storage system 108.3 and incorporated into the data 404.3, as illustrated by a directional arrow 418. As a result, the data 404.3 (which is a copy or replication of the data 404.2 originally stored on the destination storage system 106) are stored on the destination storage system 108.2, thereby assuring data availability at the destination storage system 108.2 in its role of source storage system within the data storage system environment 400.

Similarly, only the data unit 404.*a* (which is a copy or replication of the data slice [A1, A2, A3, A4]) is maintained in storage on the destination storage system 108.1 following its promotion to the role of first-layer destination storage system. The data collector function 130.5 (see FIG. 1*c*) is therefore further performed to collect the data unit 404.*a*, the data unit 404.*b*, and the data unit 404.*c* stored on the destination storage system 108.1, the destination storage system 108.2, and the destination storage system 108.3, respectively, to form data 404.4 and regain full data protection in the first layer of destination storage 402.1. To that end, the data unit 404.*a* including the data slice [A1, A2, A3, A4] is collected from the destination storage system 108.1 and incorporated into the data 404.4, as illustrated by a directional arrow 416. Further, the data unit 404.*b* including the data slice [B1, B2, B3, B4] is collected from the destination storage system 108.2 and incorporated into the data 404.4, as illustrated by a directional arrow 412; and, the data unit 404.*c* including the data slice [C1, C2, C3, C4] is collected from the destination storage system 108.3 and incorporated into the data 404.4, as illustrated by a directional arrow 420. As a result, the data 404.4 (which is also a copy or replication of the data 404.2 originally stored on the destination storage system 106) are stored on the destination storage system 108.1, thereby regaining full data protection at the destination storage system 108.1 in its role of first-layer destination storage system within the data storage system environment 400.

Figure 5A:
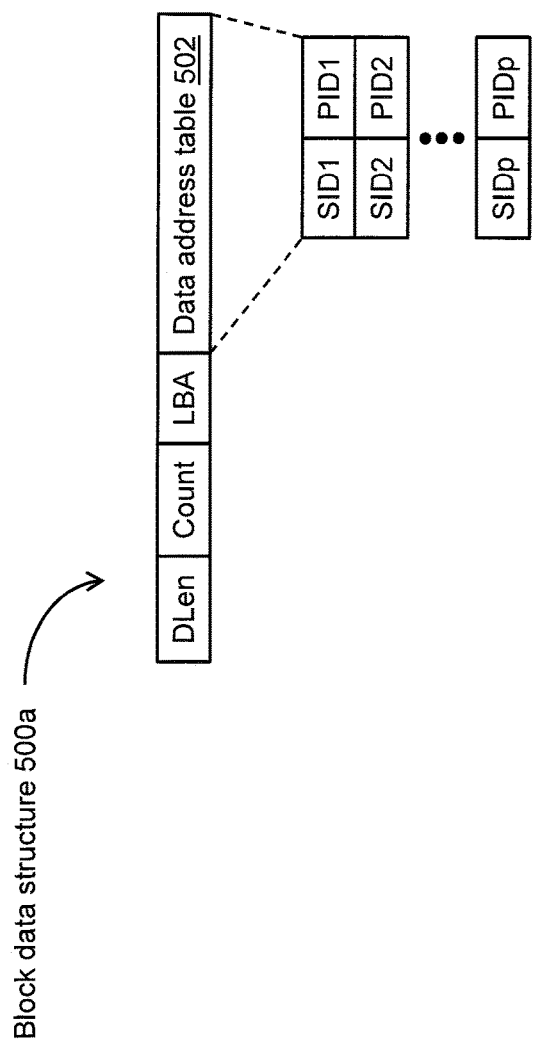

As described herein with reference to FIG. 1*a*, during a normal mode of operation, data can be collected and distributed among the source storage system 104, the first-layer destination storage system 106, and the cluster 108 of second-layer destination storage systems 108.1, 108.2, . . . , 108.*m* in accordance with the data maps 130.11 (see FIG. 1*c*) maintained by the respective storage systems 104, 106, 108.1, 108.2, . . . , 108.*m*. FIG. 5*a* depicts an exemplary block data structure 500*a* that can be used to implement the data maps 130.11 maintained by the respective storage systems 104, 106, 108.1, 108.2, . . . , 108.*m*. As shown in FIG. 5*a*, the block data structure 500*a* can include, for each data slice (such as the exemplary data slices [A1, A2, A3, A4], [B1, B2, B3, B4], and [C1, C2, C3, C4]; see FIG. 2), (i) a length (DLen) of the data slice, (ii) the total number (Count) of copies of the data slice stored among the respective storage systems 104, 106, 108.1, 108.2, . . . , 108.*m*, (iii) the start of the logical block address (LBA) of the data slice on a LUN or VVOL, for example, and (iv) a data address table 502 for storing one or more physical addresses of the data slice. As shown in FIG. 5*a*, the data address table 502 can record one or more identifiers (SID1, SID2, . . . , SIDp) for identifying the respective storage system(s) 104, 106, 108.1, 108.2, . . . , 108.*m* that store copies of the data slice, as well as one or more physical addresses (PID1, PID2, . . . , PIDp) of the data slice on the respective data storage device(s) 128.1, . . . , 128.*q* associated with the identified storage system(s) 104, 106, 108.1, 108.2, . . . , 108.*m*. It is noted that the data address table 502 can record a single physical address of a data slice, or up to "p" physical addresses of the data slice in the event there are "p" copies of the data slice stored among the respective storage systems 104, 106, 108.1, 108.2, . . . , 108.*m*.

Figure 5B:
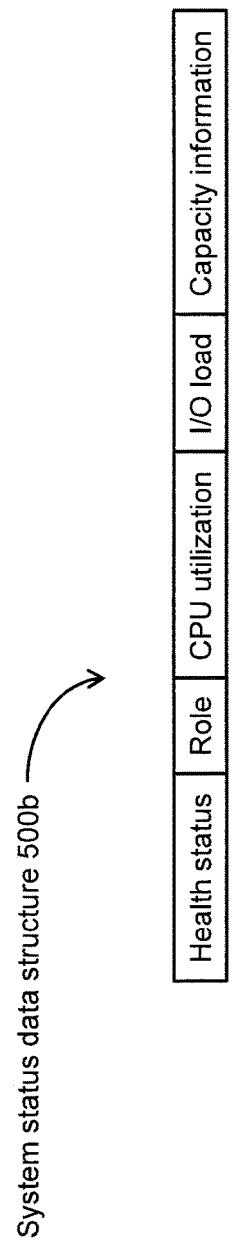

As further described herein, the statuses of the source storage system 104, the first-layer destination storage system 106, and the cluster 108 of second-layer destination storage systems 108.1, 108.2, . . . , 108.*m* can be distributed among the respective storage systems 104, 106, 108.1, 108.2, . . . , 108.*m* and stored in respective status tables 130.12 (see FIG. 1*c*). FIG. 5*b* depicts an exemplary system status data structure 500*b* that can be used to implement the status tables 130.12 maintained by the respective storage systems 104, 106, 108.1, 108.2, . . . , 108.*m*. As shown in FIG. 5*b*, the system status data structure 500*b* includes an indication of the health status of the respective storage system 104, 106, 108.1, 108.2, . . . , 108.*m*, the role (e.g., source storage system, first-layer destination storage system, second-layer destination storage system) that the respective storage system 104, 106, 108.1, 108.2, . . . , 108.*m* is taking on within the data storage system environment 100, the central processing unit (CPU) utilization of the respective storage system 104, 106, 108.1, 108.2, . . . , 108.*m*, the I/O load experienced by the respective storage system 104, 106, 108.1, 108.2, . . . , 108.*m*, and information pertaining to the capacity of the respective storage system 104, 106, 108.1, 108.2, . . . , 108.*m*. It is noted that the choice of a respective storage system for promotion within the data storage system environment 100 and/or inclusion in the cluster 108 can be based at least in part on the respective storage system's current status, as maintained in the system status data structure 500*b*.

Figure 6:
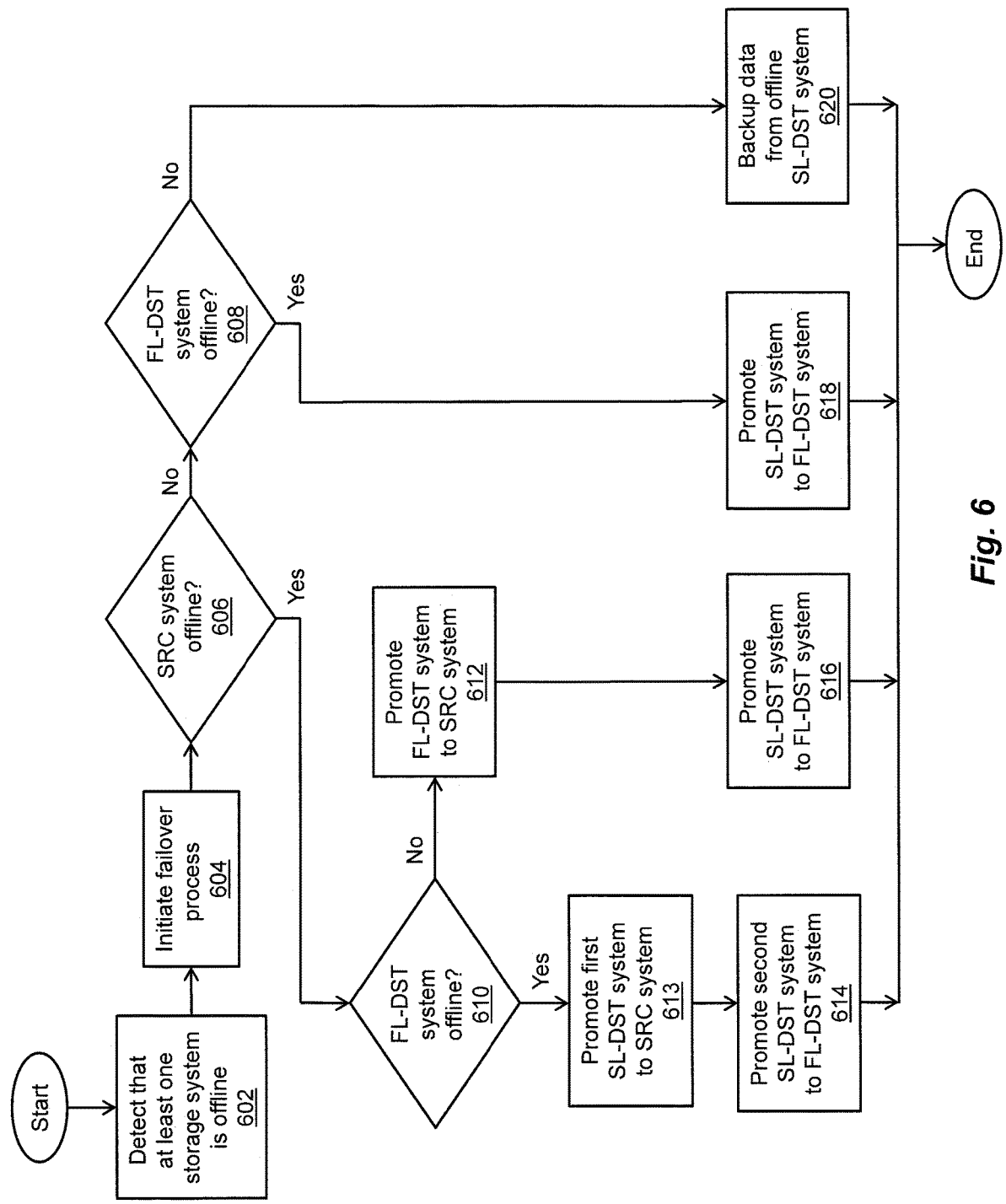
FIG. 6 is a flow diagram of an exemplary method of maintaining full data protection within the data storage system environment of FIG. 1a, in the event the source storage system and/or the first-layer destination storage system become inoperative.

An exemplary first method of maintaining full data protection within the data storage system environment 100 in the event one or more storage systems go offline is described herein with reference to FIGS. 1*a* and 6. As depicted in block 602 (see FIG. 6), at least one storage system among the source storage system 104 (also referred to herein as the "SRC system"), the first-layer destination storage system 106 (also referred to herein as the "FL-DST system"), and the cluster 108 of second-layer destination storage systems 108.1, 108.2, . . . , 108.*m* (also referred to herein as the "SL-DST system(s)") within the data storage system environment 100 (see FIG. 1*a*) is detected as being offline. As depicted in block 604, a failover process is initiated among the respective storage systems 104, 106, 108.1, 108.2, . . . , 108.*m*. As depicted in block 606, a determination is made as to whether or not the SRC system was detected as being offline. In the event the SRC system was detected as being offline, a further determination is made as to whether or not the FL-DST system was also detected as being offline, as depicted in block 610. If the FL-DST system was also detected as being offline, then a first SL-DST system is chosen from the cluster 108 of second-layer destination storage systems 108.1, 108.2, . . . , 108.*m*, and promoted to take on the role of SRC system within the data storage system environment 100, as depicted in block 613. Further, a second SL-DST system is chosen from the cluster 108 of second-layer destination storage systems 108.1, 108.2, . . . , 108.*m*, and promoted to take on the role of FL-DST system within the data storage system environment 100, as depicted in block 614. The first SL-DST system in its role of SRC system, the second SL-DST system in its role of FL-DST system, and remaining ones of the SL-DST systems in the cluster 108 then continue normal operation, in their appropriate roles, within the data storage system environment 100.

Otherwise, if the FL-DST system was not detected as being offline (i.e., the FL-DST system is currently operating online), then the FL-DST system is promoted to take on the role of SRC system within the data storage environment 100, as depicted in block 612. Further, a SL-DST system is chosen from the cluster 108 of second-layer destination storage systems 108.1, 108.2, . . . , 108.m, and promoted to take on the role of FL-DST system within the data storage system environment 100, as depicted in block 616. The FL-DST system in its role of SRC system, the SL-DST system in its role of FL-DST system, and remaining ones of the SL-DST systems in the cluster 108 then continue normal operation, in their appropriate roles, within the data storage system environment 100.

In the event the SRC system was not detected as being offline (see block 606), a further determination is made as to whether or not the FL-DST system was detected as being offline, as depicted in block 608. In the event the FL-DST system was detected as being offline, a SL-DST system is chosen from the cluster 108 of second-layer destination storage systems 108.1, 108.2, . . . , 108.m, and promoted to take on the role of FL-DST system within the data storage system environment 100, as depicted in block 618. The SRC system, the SL-DST system in its role of FL-DST system, and remaining ones of the SL-DST systems in the cluster 108 then continue normal operation, in their appropriate roles, within the data storage system environment 100. Otherwise, if the FL-DST system was not detected as being offline (i.e., the FL-DST system is currently operating online), then the storage system that was detected as being offline in block 602 corresponds to one of the SL-DST systems among the cluster 108 of second-layer storage systems 108.1, 108.2, . . . , 108.m. Data stored on the offline SL-DST system is then backed up and stored among the respective storage systems 104, 106, 108.1, 108.2, . . . , 108.m, as depicted in block 620. The SRC system, the FL-DST system, and remaining ones of the SL-DST systems in the cluster 108 then continue normal operation within the data storage system environment 100.

Figure 7:
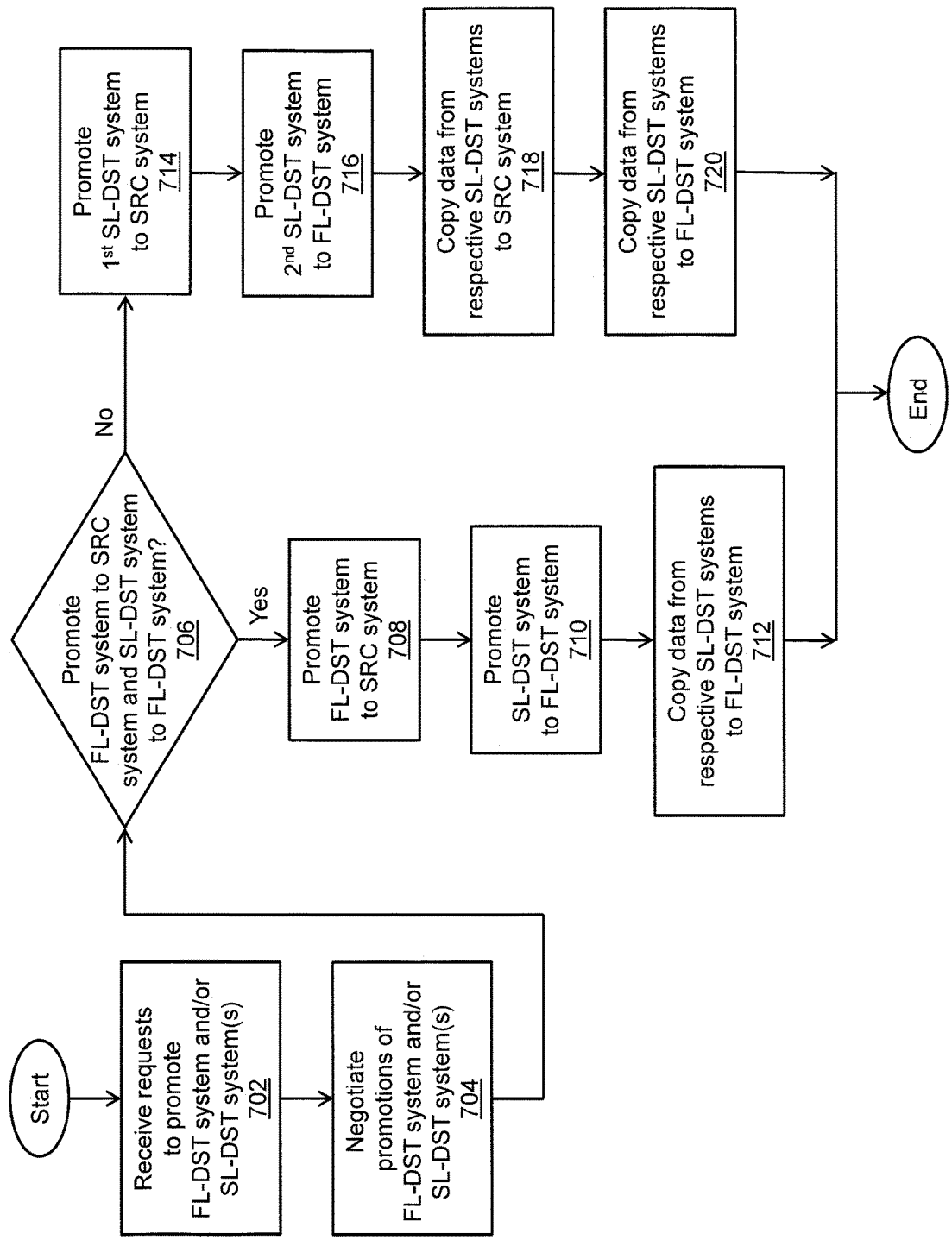

An exemplary second method of promoting the first-layer destination storage system 106 (the "FL-DST system") and/or at least one of the second-layer destination storage systems (the "SL-DST system(s)") within the data storage system environment 100 is described herein with reference to FIGS. 1a and 7. As depicted in block 702 (see FIG. 7), one or more requests are received among the source storage system (the "SRC system"), the FL-DST system, and the SL-DST systems to promote the FL-DST system and/or one or more of the SL-DST systems within the data storage system environment 100 (see FIG. 1a). As depicted in block 704, the received requests for promotion are negotiated among at least some of the SRC system, the FL-DST system, and the SL-DST systems. As depicted in block 706, a determination is made as to whether or not the FL-DST system is to be promoted to take on the role of SRC system, and one of the SL-DST systems is to be promoted to take on the role of FL-DST system. In the event the FL-DST system is to be promoted to take on the role of SRC system, and the respective SL-DST system is to be promoted to take on the role of FL-DST system, the FL-DST system is promoted to the role of SRC system, as depicted in block 708, and the respective SL-DST system is promoted to the role of FL-DST system, as depicted in block 710. Data from remaining ones of the SL-DST systems are then copied or replicated to the respective SL-DST system in its role of FL-DST system, as required to maintain full data protection in the first-layer of destination storage. The FL-DST system in its role of SRC system, the SL-DST system in its role of FL-DST system, and the remaining ones of the SL-DST systems in the cluster 108 then continue normal operation, in their appropriate roles, within the data storage system environment 100.

Otherwise, the second method proceeds from block 706 to block 714, in which a first SL-DST system is promoted to the role of SRC system. Further, a second SL-DST system is promoted to the role of FL-DST system, as depicted in block 716. As depicted in block 718, data from remaining ones of the SL-DST systems are then copied or replicated to the first SL-DST system in its role of SRC system, as required to assure data availability at the SRC system. Moreover, as depicted in block 720, data from the remaining ones of the SL-DST systems are copied or replicated to the second SL-DST system in its role of FL-DST system, as required to maintain full data protection at the first-layer of destination storage. The first SL-DST system in its role of SRC system, the second SL-DST system in its role of FL-DST system, and the remaining ones of the SL-DST systems in the cluster 108 then continue normal operation, in their appropriate roles, within the data storage system environment 100.

Figure 8:
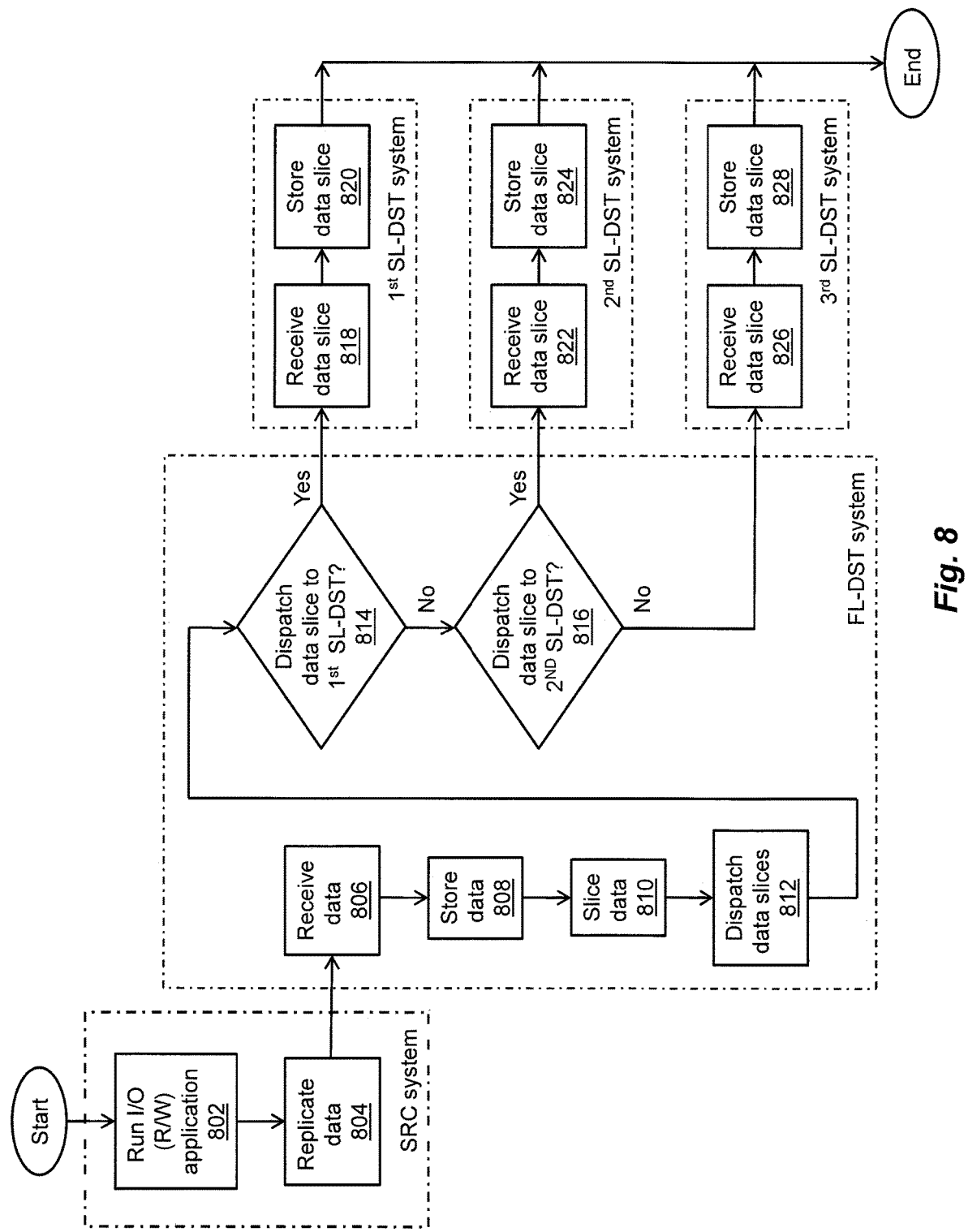

An exemplary third method of providing full data protection at the first-layer destination storage system 106 (the "FL-DST system"), and distributed data protection at the cluster 108 of second-layer destination storage systems 108.1, 108.2, . . . , 108.m (the "SL-DST systems") within the data storage system environment 100 is described herein with reference to FIGS. 1a and 8. In this third method, it is noted that (i) operations specified in blocks 802 and 804 are performed by the source storage system 104 (the "SRC system"), (ii) operations specified in blocks 806, 808, 810, 812, 814, and 816 are performed by the FL-DST system, (iii) operations specified in blocks 818 and 820 are performed in a first SL-DST system, (iv) operations specified in blocks 822 and 824 are performed in a second SL-DST system, and (v) operations specified in blocks 826 and 828 are performed in a third SL-DST system.

As depicted in block 802 (see FIG. 8), within the data storage system environment 100 (see FIG. 1a), an I/O (R/W) application is run on the SRC system, which stores data including a plurality of data slices. The data stored by the SRC system are copied or replicated, as depicted in block 804, and subsequently dispatched and received at the FL-DST system, as depicted in block 806. As depicted in block 808, the received data including the plurality of data slices are stored by the FL-DST system. Further, the data is sliced to obtain the respective data slices including at least a first data slice, a second data slice, and a third data slice, as depicted in block 810. The first data slice, the second data slice, and the third data slice are then dispatched from the FL-DST system for delivery at the first SL-DST system, the second SL-DST system, and the third SL-DST system, respectively, as depicted in block 812. A determination is then made as to whether or not a respective data slice is to be dispatched to the first SL-DST system, as depicted in block 814. In the event the respective data slice is to be dispatched to the first SL-DST system (i.e., the respective data slice corresponds to the first data slice), the first data slice is dispatched and received at the first SL-DST system, as depicted in block 818. Further, the first data slice is stored by the first SL-DST system, as depicted in block 820.

A further determination is made as to whether or not a respective data slice is to be dispatched to the second SL-DST system, as depicted in block 816. In the event the respective data slice is to be dispatched to the second SL-DST system (i.e., the respective data slice corresponds to the second data slice), the second data slice is dispatched and received at the second SL-DST system, as depicted in block 822. The second data slice is then stored by the second SL-DST system, as depicted in block 824. Otherwise, the respective data slice is dispatched to and received at the third SL-DST system (i.e., the respective data slice corresponds to the third data slice), as depicted in block 826. The third data slice is then stored by the third SL-DST system, as depicted in block 828. The SRC system, the FL-DST system, and the first, second, and third SL-DST systems in the cluster 108 then commence normal operation, in their appropriate roles, within the data storage system environment 100.

Having described the above illustrative embodiments of the disclosed systems and methods, other alternative embodiments, modifications, and/or variations may be made. For example, it was described herein that, having promoted a second-layer destination storage system to take on the role of source storage system in a data storage system environment, a data collector function could be performed to assure data availability at the second-layer destination storage system in its role of source storage system. In certain alternative embodiments, the performance of such a data collector function may be deferred until a later time when an I/O request for at least some of the data is received at the source storage system.

While various embodiments of the invention have been particularly shown and described, it will be understood by those skilled in the art that various changes in form and details may be made therein without departing from the scope of the invention as defined by the appended claims.

What is claimed is:

1. A method of providing data protection in a high availability cluster network environment, comprising:
   providing a source storage system, a first-layer destination storage system in a first layer of destination storage, and a cluster of second-layer destination storage systems in a second layer of destination storage, the source storage system storing data including a plurality of data slices, the first-layer destination storage system storing a replica of the data including the plurality of data slices to provide full protection of the data at the first-layer destination storage system, and the cluster of second-layer destination storage systems storing replicas of the data including the plurality of data slices respectively distributed among the second-layer destination storage systems to provide distributed protection of the data at the respective second-layer destination storage systems;
   in response to the source storage system becoming inoperative:
      promoting the first-layer destination storage system to a role of the source storage system;
      regaining the full protection of the data by promoting a chosen one of the second-layer destination storage systems in the cluster to a role of the first-layer destination storage system; and
      providing the distributed protection of the data at remaining ones of the respective second-layer destination storage systems;
   obtaining a status of each respective second-layer destination storage system from among the second-layer destination storage systems in the cluster, the status corresponding to one or more of a role, a health status, and a load status of the respective second-layer destination storage system; and
   choosing the chosen one of the second-layer destination storage systems in the cluster for the role of first-layer destination storage system based on the status of the chosen one of the second-layer destination storage systems.

2. The method of claim 1 further comprising:
   replicating the data including the plurality of data slices for storage on the first-layer destination storage system; and
   storing the replica of the data including the plurality of data slices on the first-layer destination storage system.

3. The method of claim 1 further comprising:
   replicating the data including the plurality of data slices for storage on the second-layer destination storage systems; and
   slicing the replicated data to obtain the replicas of the plurality of data slices.

4. The method of claim 3 further comprising:
   distributing the replicas of the plurality of data slices among the respective second-layer destination storage systems; and
   storing the replicas of the plurality of data slices respectively distributed among the second-layer destination storage systems.

5. The method of claim 1 further comprising:
   collecting data slices from the remaining ones of the second-layer destination storage systems in the cluster;
   providing the collected data slices to the chosen one of the second-layer destination storage systems in the role of first-layer destination storage system to replicate the data including the plurality of data slices; and
   storing the replicated data including the plurality of data slices on the chosen one of the second-layer destination storage systems.

6. A method of providing data protection in a high availability cluster network environment, comprising:
   providing a source storage system, a first-layer destination storage system in a first layer of destination storage, and a cluster of second-layer destination storage systems in a second layer of destination storage, the source storage system storing data including a plurality of data slices, the first-layer destination storage system storing a replica of the data including the plurality of data slices to provide full protection of the data at the first-layer destination storage system, and the cluster of second-layer destination storage systems storing replicas of the data including the plurality of data slices respectively distributed among the second-layer destination storage systems to provide distributed protection of the data at the respective second-layer destination storage systems;
   in response to each of the source storage system and the first-layer destination storage system becoming inoperative:
      promoting a chosen first one of the second-layer destination storage systems in the cluster to a role of the source storage system;
      regaining the full protection of the data by promoting a chosen second one of the second-layer destination storage systems in the cluster to a role of the first-layer destination storage system; and
      providing the distributed protection of the data at remaining ones of the respective second-layer destination storage systems;
   obtaining a status of each respective second-layer destination storage system from among the second-layer destination storage systems in the cluster, the status corresponding to one or more of a role, a health status, and a load status of the respective second-layer destination storage system;
   choosing the chosen first one of the second-layer destination storage systems in the cluster for the role of source storage system based on the status of the chosen first one of the second-layer destination storage systems; and choosing the chosen second one of the second-layer destination storage systems in the cluster for the role of first-layer destination storage system based on the status of the chosen second one of the second-layer destination storage systems.

7. The method of claim 6 further comprising:

collecting data slices from the remaining ones of the second-layer destination storage systems in the cluster;

providing the collected data slices to the chosen first one of the second-layer destination storage systems in the role of source storage system to replicate the data including the plurality of data slices; and storing the replicated data including the plurality of data slices on the chosen first one of the second-layer destination storage systems.

8. The method of claim 7 further comprising:

collecting further data slices from the remaining ones of the second-layer destination storage systems in the cluster;

providing the collected further data slices to the chosen second one of the second-layer destination storage systems in the role of first-layer destination storage system to replicate the data including the plurality of data slices; and storing the replicated data including the plurality of data slices on the chosen second one of the second-layer destination storage systems.

9. A system for providing data protection in a high availability cluster network environment, comprising:

a source storage system, the source storage system including one or more storage devices configured to store data including a plurality of data slices;

a first-layer destination storage system in a first layer of destination storage, the first-layer destination storage system including one or more storage devices configured to store a replica of the data including the plurality of data slices to provide full protection of the data at the first-layer destination storage system; and a cluster of second-layer destination storage systems in a second layer of destination storage, each of the cluster of second-layer destination storage systems including one or more storage devices configured to store replicas of the data including the plurality of data slices respectively distributed among the second-layer destination storage systems to provide distributed protection of the data at the respective second-layer destination storage systems, wherein the first-layer destination storage system includes processing circuitry having an associated memory, and each of the second-layer destination storage systems includes processing circuitry having an associated memory, and wherein the processing circuitry of the first-layer destination storage system and the processing circuitries of the respective second-layer destination storage systems are configured to execute, in concert, program instructions out of their respective associated memories:

to detect the source storage system becoming inoperative;

having detected the source storage system becoming inoperative, to promote the first-layer destination storage system to a role of the source storage system;

having promoted the first-layer destination storage system to the role of the source storage system, to regain the full protection of the data by promoting a chosen one of the second-layer destination storage systems in the cluster to a role of the first-layer destination storage system;

to provide the distributed protection of the data at remaining ones of the respective second-layer destination storage systems;

to obtain a status of each respective second-layer destination storage system from among the second-layer destination storage systems in the cluster, the status corresponding to one or more of a role, a health status, and a load status of the respective second-layer destination storage system; and to choose the chosen one of the second-layer destination storage systems in the cluster for the role of first-layer destination storage system based on the status of the chosen one of the second-layer destination storage systems.

10. The system of claim 9 wherein the processing circuitry of the first-layer destination storage system is further configured to execute program instructions out of its associated memory to replicate the data including the plurality of data slices for storage on the second-layer destination storage systems, and to slice the replicated data to obtain the replicas of the plurality of data slices.

11. The system of claim 10 wherein the processing circuitry of the first-layer destination storage system is further configured to execute program instructions out of its associated memory to distribute the replicas of the plurality of data slices among the respective second-layer destination storage systems in the cluster.

12. The system of claim 11 wherein the processing circuitries of the respective second-layer destination storage systems are further configured to execute program instructions out of their associated memories to store the replicas of the plurality of data slices respectively distributed among the second-layer destination storage systems.

13. The system of claim 9 wherein the processing circuitry of the first-layer destination storage system and the processing circuitries of the respective second-layer destination storage systems are further configured to execute, in concert, program instructions out of their respective associated memories to collect data slices from the remaining ones of the second-layer destination storage systems in the cluster, and to provide the collected data slices to the chosen one of the second-layer destination storage systems in the role of first-layer destination storage system to replicate the data including the plurality of data slices.

14. The system of claim 13 wherein the processing circuitry of the chosen one of the second-layer destination storage systems is further configured to execute program instructions out of its associated memory to store the replicated data including the plurality of data slices.

15. A computer program product having a non-transitory computer readable medium that stores a set of instructions that, when carried out by computerized circuitry, cause the computerized circuitry to perform a method of:

storing data including a plurality of data slices on a source storage system;

storing a replica of the data including the plurality of data slices on a first-layer destination storage system in a first layer of destination storage to provide full protection of the data at the first-layer destination storage system;

distributing replicas of the data including the plurality of data slices among a cluster of second-layer destination storage systems in a second layer of destination storage to provide distributed protection of the data at the respective second-layer destination storage systems;

storing the distributed replicas of the plurality of data slices on the respective second-layer destination storage systems in the second layer of destination storage; and operating the first-layer destination storage system and the cluster of second-layer destination storage systems in concert:

to detect the source storage system becoming inoperative;

having detected the source storage system becoming inoperative, to promote the first-layer destination storage system to a role of the source storage system;

having promoted the first-layer destination storage system to the role of the source storage system, to regain the full protection of the data by promoting a chosen one of the second-layer destination storage systems in the cluster to a role of the first-layer destination storage system; and to provide the distributed protection of the data at remaining ones of the respective second-layer destination storage systems, wherein the operating of the first-layer destination storage system and the cluster of second-layer destination storage systems in concert includes:

obtaining a status of each respective second-layer destination storage system from among the second-layer destination storage systems in the cluster, the status corresponding to one or more of a role, a health status, and a load status of the respective second-layer destination storage system; and choosing the chosen one of the second-layer destination storage systems in the cluster for the role of first-layer destination storage system based on the status of the chosen one of the second-layer destination storage systems.

16. The method of claim 15 wherein the operating of the first-layer destination storage system and the cluster of second-layer destination storage systems in concert further includes collecting data slices from remaining ones of the second-layer destination storage systems in the cluster, and providing the collected data slices to the chosen one of the second-layer destination storage systems in the role of first-layer destination storage system to replicate the data including the plurality of data slices.

\* \* \* \* \*